UNITED STATES PATENT OFFICE.

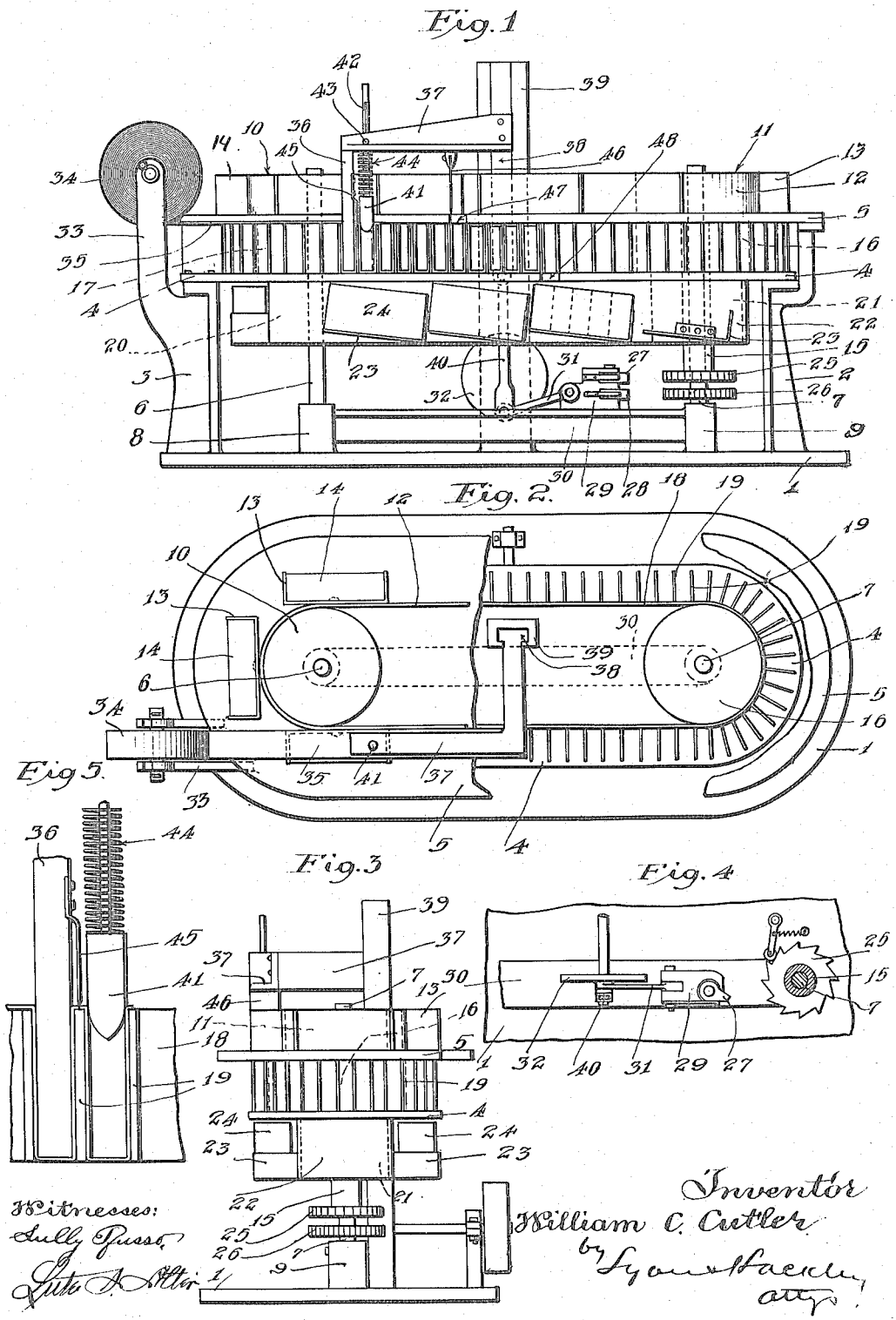
W. C. CUTLER.
ICE CREAM PACKING MACHINE.
APPLICATION FILED APR. 21, 1914.
1,128,762. Patented Feb. 16, 1915.

WILLIAM C. CUTLER, OF LOS ANGELES, CALIFORNIA.

ICE-CREAM-PACKING MACHINE.

1,128,762.  Specification of Letters Patent.  Patented Feb. 16, 1915.

Application filed April 21, 1914. Serial No. 833,376.

*To all whom it may concern:*

Be it known that I, WILLIAM C. CUTLER, a citizen of the United States, residing at Los Angeles, in the county of Los Angeles and State of California, have invented a new and useful Ice-Cream-Packing Machine, of which the following is a specification.

This invention relates to a machine designed for cutting blocks of ice cream into smaller portions of suitable sizes, wrapping such portions with paper, and packing the wrapped portions in boxes, and the object of the invention is to provide a simple mechanism for accomplishing this effectively.

Referring to the drawings: Figure 1 is a side elevation of the machine. Fig. 2 is a plan view. Fig. 3 is an end elevation. Fig. 4 is a plan view of the intermittent actuating mechanism. Fig. 5 is an enlarged end view of the forming plunger.

The machine comprises a base 1 with standards 2 and 3, which support a lower table 4, and an upper table 5. Shafts 6 and 7 are respectively journaled in their lower ends by step bearings 8 and 9, and project up through the tables 4 and 5, and at their upper ends carry respectively pulleys 10 and 11, over which runs a belt 12, which at intervals is provided with carriers 13, each of which is adapted to contain a block of ice cream 14, the belt 11 and blocks of ice cream resting edgewise upon the table 5.

Rotatable on the shaft 7 is a hollow shaft 15, which carries a pulley 16, and loosely mounted on shaft 6 is a pulley 17, and mounted on the pulleys 16 and 17 is a belt 18 having carriers 19 spaced together a distance equal to the thickness of each slice of ice cream which is to be cut from the larger blocks 14, and the belt 18 is supported edgewise by the table 4. Also loosely mounted on shaft 6 is a pulley 20, and rigidly mounted on hollow shaft 15 is a pulley 21, and carried on pulleys 20 and 21 is a belt 22, having a series of shelves 23, which carry boxes 24 which are to be packed with the wrapped slices of ice cream, the shelves 23 being inclined as shown to cause the wrapped slices of ice cream to slide toward the lower end, and thus cause the packages to automatically arrange themselves close together in each box.

The sleeve 15 has a ratchet wheel 25 and the shaft 7 has a ratchet wheel 26 with finer teeth than the ratchet wheel 25, the respective ratchet wheels being operated by pawls 27 and 28 carried on a cross head 29, which is slidable on a guide 30 and operated by a connecting rod 31 from a disk 32, which imparts a sufficient throw to the cross head 29, so that rotation of the ratchet wheels is intermittent with intervening time periods, permitting proper operation of the mechanism as will be described. The slices of ice cream which are to be cut from the blocks 14 will, when deposited between the carriers 19 on belt 18, be spaced apart somewhat owing to the thickness of the carriers 19, so that it is necessary to cause the blocks 14 to travel at a slightly slower rate of speed than the belt 19 which carries the slices, and this is accomplished by the finer teeth of the ratchet 26.

A bracket 33 on the standard 3 carries a roll of paper 34, which is to be used in wrapping the cut slices of ice cream, and the paper strip 35 extends along over the upper edges of the carriers 19, and is depressed with a loop into the space between each pair of carriers 19 by a plunger 36, this plunger being rigidly carried by an arm 37 which is mounted on a vertical slide 38, operating on a vertical standard 39, which projects up through the tables 4 and 5, and the slide 38 is operated by a pitman 40 connected with the driving disk 32, so that at each stroke, during the time the pawls 27 and 28 are out of engagement with their respective ratchet wheels 25 and 26, the plunger 36 is reciprocated to fold the strip 35 with a loop into a space between the two associated carriers 19. A holding plunger 41 is slidably mounted on a bracket 37, and has a slotted stem 42 through which a pin 43 passes to control its relative movement on the bracket with respect to the bracket. A compression spring 44 tends to depress the holding plunger 41 so that its lower end which is rounded and wider than the space between the two carriers 19 will press against the two upper folds of the loop of paper 35 into the space below it and thus securely hold the paper against slipping, while the plunger 36 descends into the adjacent space to form the next loop in the paper, the spring 44 at this time acting to freely press the holding plunger 41 against the paper, while the bracket 37 descends in operating the plunger 36, and the holding plunger 41 remains pressed against the paper until the bracket 37 has lifted the plunger 36 out of the loop it has formed, by which time the pin 43 reaches the upper end of slot 42, and lifts the holding plunger 41 so that it frees the folded paper, and permits the belt 18 to move the same along, as by this time the pawl 28 engages the ratchet wheel 26 to operate the same. A thin knife 45 is carried by the bracket 37 close to the holding plunger 41, and acts to cut the paper between the loops, just at the completion of the formation of the pressing loop by the plunger 36, so that the space between the carriers 19 become lined with individual sheets of paper which are adapted to receive slices of ice cream. A knife 46 is also carried by the bracket 37 and at each downward stroke thereof it passes through the block of ice cream 14, and cuts slices therefrom which fall through a slot 47 onto the table 5, and into the open loop of paper directly below it.

As before explained, the blocks of ice cream 14 are moved along at a slightly slower speed than the slices of ice cream below it. At each stroke the block of ice cream 14 is moved the thickness of one slice so that each slice thereof falls through the opening 47 into proper alinement with the loop of paper which is to receive it below the slot 47. When the loop of paper with its slice of ice cream has arrived at a slot 48, the paper falls with its contents into the box 24 beneath, and in this way each box 24 becomes filled with a series of slices of ice cream, each slice being wrapped and separated from the other slice in its own individual sheet of paper which enables that slice to be quickly removed from the box for sale or use without the necessity of cutting the portion by hand. While I have herein referred to the machine as constructed for ice cream, it will be understood that it may be employed for any other produce for which it is adapted.

What I claim is:—

1. A carrier for uncut blocks, a carrier for slices below the first carrier and movable horizontally at a different speed than the first carrier, a carrier for boxes below the second carrier, means for operating said carriers, means for slicing said blocks and allowing the slices to fall into the second carrier, and means for allowing the slices to subsequently fall from the second carrier into the box.

2. A carrier for blocks, a carrier for slices under the first carrier, a carrier for boxes under the second carrier, means for slicing the blocks, and allowing the blocks to fall into the second carrier, means for placing folded papers in the second carrier to receive the slices, and means for permitting the papers with their contained slices to fall into boxes upon the third carrier.

3. A carrier for blocks, a carrier for slices, means for slicing the blocks, means for feeding a strip of paper along the second carrier, means for folding said strip into loops in said second carrier, means for cutting said loops apart, means for allowing said slices to fall into the loops of paper, and means for allowing the filled papers to be discharged from the second carrier.

4. A carrier for blocks, a carrier for slices, means for slicing the blocks, means for feeding a strip of paper along the second carrier, means for folding said strip into loops in said second carrier, means for cutting said loops apart, means for allowing said slices to fall into the loops of paper, a third carrier for boxes, and means permitting the filled papers to fall into boxes on the third carrier.

5. A carrier for blocks, a carrier for slices, with partitions for separating the slices, a plunger, means for operating said plunger to depress said strip between said partitions, means for cutting said paper between said partitions, means for slicing the blocks, and means for permitting said slices to fall into the papers in the second carrier.

6. A carrier for blocks, a carrier for slices, with partitions for separating the slices, a plunger, means for operating said plunger to depress said strip between said partitions, means for cutting said paper between said partitions, means for slicing the blocks, means for permitting said slices to fall into the papers in the second carrier, another plunger, and means for causing the end of the second plunger to press the paper against the ends of the adjoining partitions to prevent slipping of the paper while the first plunger folds the paper into a loop in an adjoining space between other partitions.

7. A carrier for blocks, a carrier for slices, with partitions for separating the slices, a plunger, means for operating said plunger to depress said strip between said partitions, means for cutting said paper between said partitions, means for slicing the blocks, means for permitting said slices to fall into the papers in the second carrier, and a knife associated with the holding plunger for cutting the paper at the upper edge of each partition.

In testimony whereof, I have hereunto set my hand at Los Angeles, California, this 4th day of April, 1914.

WILLIAM C. CUTLER.

In presence of—
 Geo. T. Hackley,
 Lorraine E. Durrow.